United States Patent
Lee (10) Patent No.: US 8,260,381 B2
(45) Date of Patent: Sep. 4, 2012

(54) APPARATUS AND METHOD FOR DETECTING PHYSICAL STATE AND HOLSTER PRESENCE

(75) Inventor: Yun Sun Lee, Rolling Meadows, IL (US)

(73) Assignee: Research In Motion Limited, Waterloo (CA)

( * ) Notice: Subject to any disclaimer, the term of this patent is extended or adjusted under 35 U.S.C. 154(b) by 409 days.

(21) Appl. No.: 12/631,031

(22) Filed: Dec. 4, 2009

(65) Prior Publication Data

US 2011/0136552 A1      Jun. 9, 2011

(51) Int. Cl.
*H04M 1/00* (2006.01)

(52) U.S. Cl. ............... 455/575.3; 455/575.4; 455/575.8; 455/556.1; 455/575.6

(58) Field of Classification Search ............... 455/575.3, 455/550.1, 556.1, 575.1, 575.6, 575.8, 90.3, 455/128
See application file for complete search history.

(56) References Cited

U.S. PATENT DOCUMENTS

| | | | |
|---|---|---|---|
| 6,356,741 B1 | 3/2002 | Bilotti et al. | |
| 6,622,012 B2 | 9/2003 | Bilotti et al. | |
| 7,085,119 B2 | 8/2006 | Bilotti et al. | |
| 7,209,769 B2 | 4/2007 | Lail, Jr. et al. | |
| 7,288,934 B1 | 10/2007 | Ikarashi et al. | |
| 7,307,824 B2 | 12/2007 | Bilotti et al. | |
| 7,471,967 B2 | 12/2008 | Kang et al. | |
| 7,523,012 B2 | 4/2009 | Shah et al. | |
| 2007/0089311 A1 | 4/2007 | Amundson et al. | |
| 2008/0164843 A1 | 7/2008 | Jang et al. | |

FOREIGN PATENT DOCUMENTS

| | | |
|---|---|---|
| EP | 1 542 435 | 6/2005 |
| EP | 1 879 364 | 1/2008 |
| EP | 1 950 940 | 7/2008 |
| JP | 2004/228959 | 8/2004 |

OTHER PUBLICATIONS

Extended European Search Report from corresponding European Patent Application No. 09178120.3 issued on Jun. 7, 2010, 6 pages total.
English translation of JP 2004/228959.

*Primary Examiner* — Marcos Torres
(74) *Attorney, Agent, or Firm* — Novak Druce + Quigg LLP (57) ABSTRACT

A mobile device has a first housing and a second housing movably coupled to the first housing such that the mobile device can be manipulated between an open state and a closed state. The mobile device can also be placed in a holster. In accordance with an embodiment of the disclosure, the mobile device has a sensor configured to generate a sensor output indicative of (i) whether the mobile device is in the open state or closed state and (ii) whether the mobile device is in the holster.

17 Claims, 7 Drawing Sheets

APPARATUS AND METHOD FOR DETECTING PHYSICAL STATE AND HOLSTER PRESENCE

FIELD OF THE DISCLOSURE

This disclosure relates to mobile devices, and more particularly to detecting a physical state of a mobile device and presence of a holster.

BACKGROUND

A user of a mobile device may prefer that the mobile device is rather small so that it can easily fit in a pocket or hand bag for example. At the same time, the user may wish that the mobile device has a user interface that is large enough to facilitate ease of use. In order to address these issues, some mobile devices are designed such that they can be manipulated between an open state in which a user interface is made available to the user, and a closed state in which the mobile device is more compact. As a first example, flip phones can be flipped open like a clam shell to expose a keypad and/or display and can be subsequently flipped closed after use. As a second example, slider phones can be slid open to expose a keypad and/or display and can be subsequently slid closed after use. These mobile devices typically have a sensor to detect whether the mobile device is in the open state or the closed state.

Additionally, some mobile devices are provided with a holster. A mobile device can be placed in a holster for example when the mobile device is not in use, or when the mobile device is in use while using a headset. The holster can help to prevent accidental key-presses. These mobile devices often have another sensor to detect presence of the holster. This can for example allow for configurable notification settings, for example vibration alert for an incoming call when in the holster or ring alert for an incoming call when out of the holster. Other notification settings may be possible depending on whether the mobile device is in the holster. Furthermore, various features might be disabled while the mobile device is in the holster. This might help to reduce power consumption.

BRIEF DESCRIPTION OF THE DRAWINGS

Embodiments will now be described with reference to the attached drawings in which.

DETAILED DESCRIPTION OF EMBODIMENTS

Existing approaches use a sensor to detect whether the mobile device is in the open state or the closed state, and a separate sensor to detect presence of a holster. Unfortunately, the separate sensor adds to the cost of the mobile device and might also increase power consumption. Furthermore, there may be limited placement locations for the separate sensor so as to achieve sufficient isolation from other sensors (i.e. need to space sensors far enough apart). Combined with the fact that the separate sensor consumes space, the size of the mobile device can be undesirably increased due to the separate sensor. Some embodiments of the present disclosure address these problems by using a single sensor to detect (i) whether the mobile device is in the open state or the closed state, and (ii) whether the mobile device is in a holster.

According to a broad aspect of the disclosure, there is provided a mobile device comprising: a first housing; a second housing movably coupled to the first housing such that the mobile device can be manipulated between an open state and a closed state; a sensor configured to generate a sensor output indicative of (i) whether the mobile device is in the open state or the closed state irrespective of whether the mobile device is in a holster and (ii) whether the mobile device is in the holster irrespective of whether the mobile device is in the open state or the closed state; and a state determiner configured to determine based on the sensor output from the sensor (i) whether the mobile device is in the open state or the closed state irrespective of whether the mobile device is in the holster and (ii) whether the mobile device is in the holster irrespective of whether the mobile device is in the open state or the closed state.

According to another broad aspect of the disclosure, there is provided a holster in combination with a mobile device, the mobile device comprising: a first housing; a second housing movably coupled to the first housing such that the mobile device can be manipulated between an open state and a closed state; a sensor configured to generate a sensor output indicative of (i) whether the mobile device is in the open state or the closed state irrespective of whether the mobile device is in the holster and (ii) whether the mobile device is in the holster irrespective of whether the mobile device is in the open state or the closed state; and a state determiner configured to determine based on the sensor output from the sensor (i) whether the mobile device is in the open state or the closed state irrespective of whether the mobile device is in the holster and (ii) whether the mobile device is in the holster irrespective of whether the mobile device is in the open state or the closed state.

According to another broad aspect of the disclosure, there is provided a method comprising: a sensor generating a sensor output indicative of (i) whether a mobile device is in an open state or a closed state irrespective of whether the mobile device is in a holster, and (ii) whether the mobile device is in the holster irrespective of whether the mobile device is in the open state or the closed state; and determining based on the sensor output from the sensor (i) whether the mobile device is in the open state or the closed state irrespective of whether the mobile device is in the holster, and (ii) whether the mobile device is in the holster irrespective of whether the mobile device is in the open state or the closed state.

Other aspects and features of the present disclosure will become apparent, to those ordinarily skilled in the art, upon review of the following description of the specific embodiments. It should be understood at the outset that although illustrative implementations of one or more embodiments of the present disclosure are provided below, the disclosed systems and/or methods may be implemented using any number of techniques, whether currently known or in existence. The disclosure should in no way be limited to the illustrative implementations, drawings, and techniques illustrated below, including the exemplary designs and implementations illustrated and described herein, but may be modified within the scope of the appended claims along with their full scope of equivalents.

Apparatus for Detecting Device State & Holster

Figure 1A:
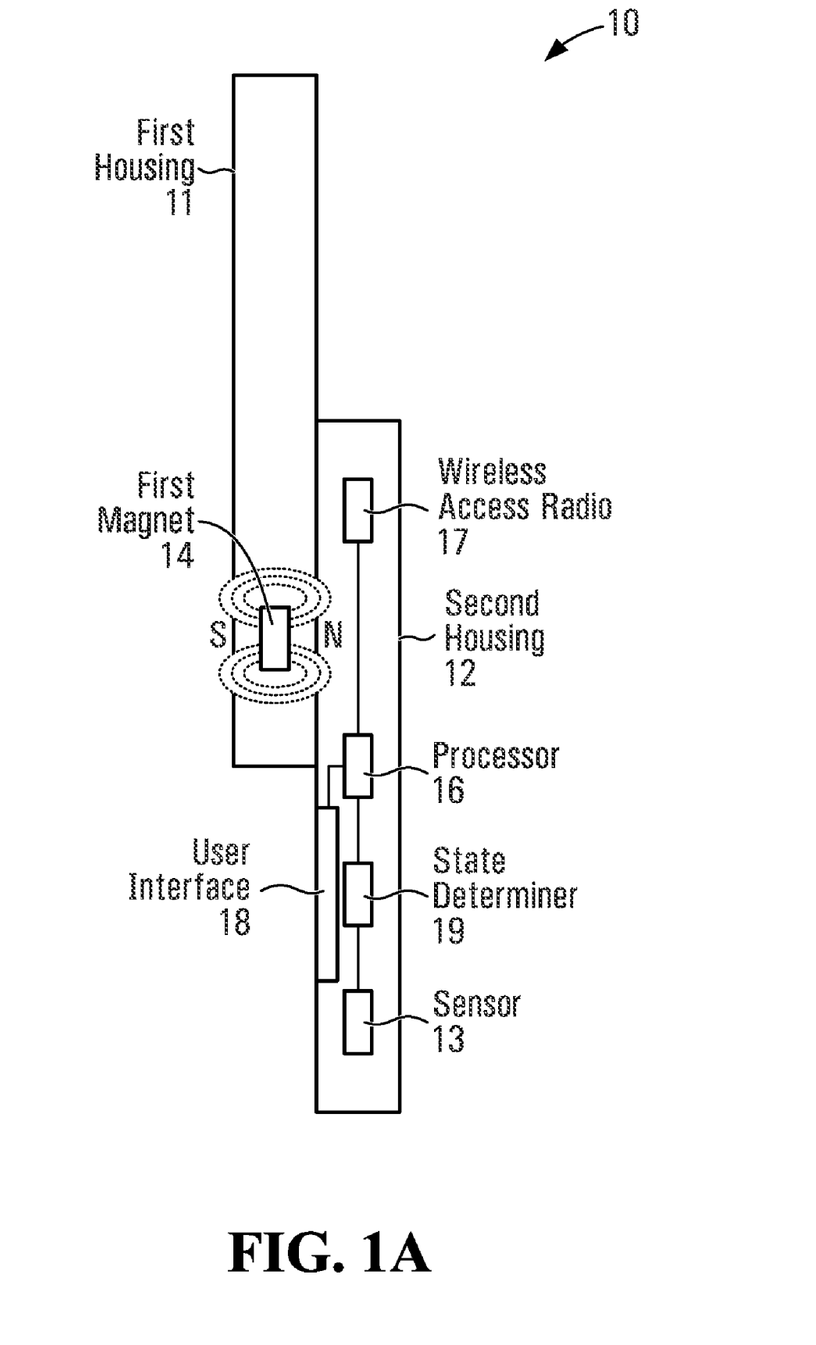
FIGS. 1A and 1B are block diagrams of a mobile device.
Figure 1B:
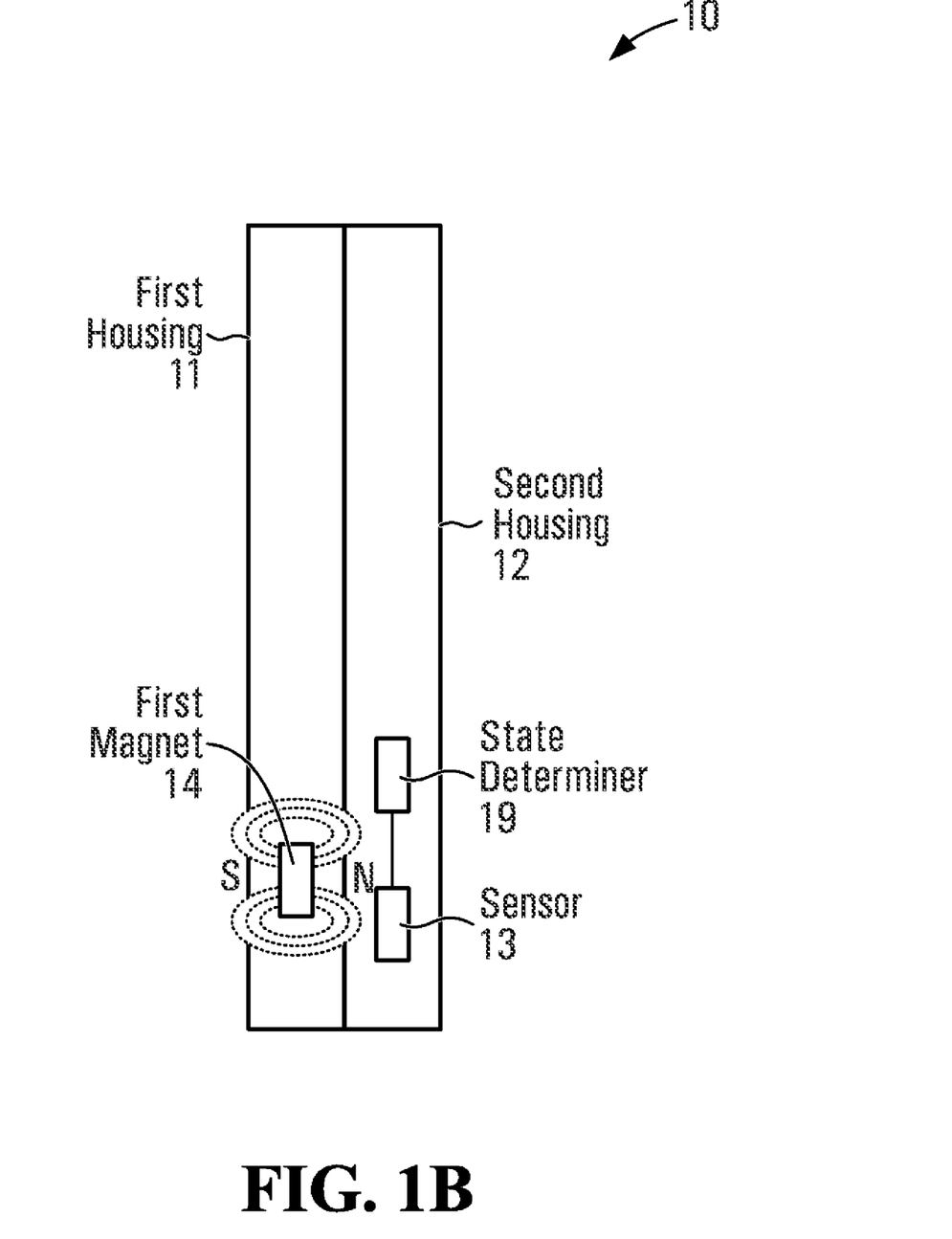

Referring first to FIGS. 1A and 1B, shown are block diagrams of a mobile device 10. The mobile device 10 has a first housing 11 and a second housing 12 that is slidably coupled to the first housing 11. The first housing 11 has a first magnet 14. The second housing 12 has a sensor 13, a state determiner 19, a processor 16, a wireless access radio 17, and a user interface 18. The mobile device 10 may have other components, but they are not shown for sake of simplicity.

The operation of the mobile device 10 will now be described by way of example. The second housing 12 is slidably coupled to the first housing 11 such that the mobile device 10 can be slid open (see FIG. 1A) thereby making the user interface 18 available during use, and subsequently slid closed (see FIG. 1B) thereby making the mobile device 10 compact again. The sensor 13 is configured to generate a sensor output indicative of whether the mobile device 10 is slid open or slid closed by detecting presence or absence of magnetic field from the first magnet 14. The state determiner 19 is configured to determine based on the sensor output whether the mobile device 10 is slid open or slid closed. Note that this detection is irrespective of whether the mobile device 10 is in a holster.

Figure 2:
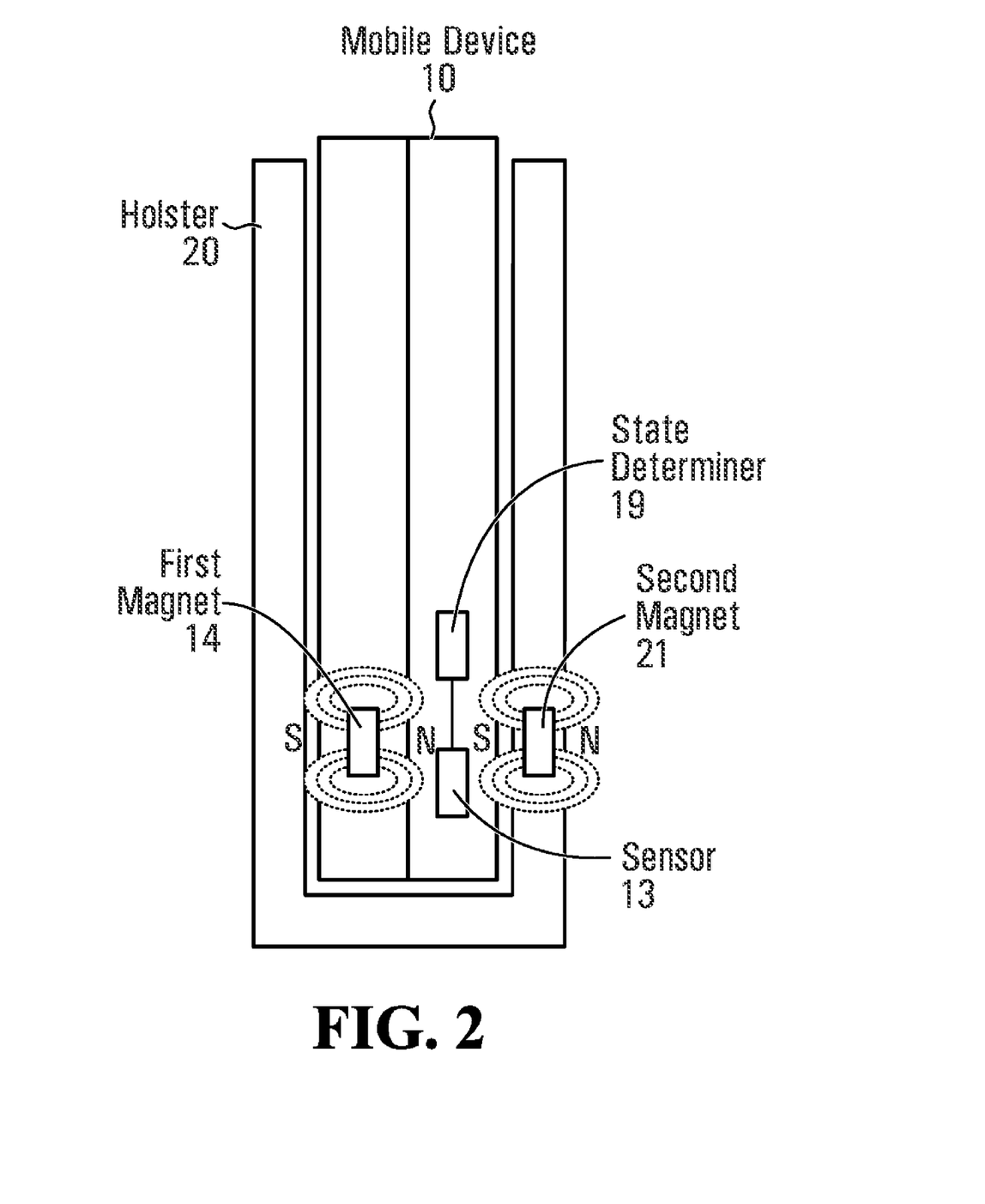
FIG. 2 is a block diagram of the mobile device of FIGS. 1A and 1B in a holster.

Referring now to FIG. 2, shown is a block diagram of the mobile device 10 in a holster 20. The holster 20 has a second magnet 21. In accordance with an embodiment of the disclosure, the sensor 13 is configured to generate the sensor output to additionally indicate whether the mobile device 10 is in the holster 20 by detecting presence or absence of magnetic field from the second magnet 21. The state determiner 19 is configured to determine based on the sensor output whether the mobile device 10 is in the holster 20. Note that this detection is irrespective of whether the mobile device 10 is slid open or slid closed. It is to be understood that the same sensor 13 is used for this purpose. There is no separate sensor to detect whether the mobile device 10 is in the holster 20. This can reduce cost of the mobile device 10. Additionally, or alternatively, this can reduce the size of the mobile device 10. In some implementations, the processor 16 executes at least one action based on (i) whether the mobile device 10 is slid open or slid closed and/or (ii) whether the mobile device 10 is in the holster 20. Examples of this are described later.

The first and second magnets 14, 21 and the sensor 13 are positioned in a preconfigured manner so that the sensor 13 can detect presence/absence of the magnetic fields from the first and second magnets 14, 21. The sensor 13 might for example have two outputs: a first output indicating presence/absence of magnetic field from the first magnet 14, and a second output indicating presence/absence of magnetic field from the second magnet 21. More generally, the sensor 13 can have one or more outputs from which presence/absence of the magnetic fields from the first and second magnets 14, 21 can be discerned.

In specific implementations, as depicted in the illustrated example, the sensor 13 is a polarity-dependent magnetic sensor having two outputs: a first output indicating presence/absence of N-pole field and a second output indicating presence/absence of S-pole field. Therefore, this sensor 13 is capable of detecting a N-pole field generated by the first magnet 14 and a S-pole field generated by the second magnet 21. Of course the opposite configuration is possible in which the first and second magnets 14, 21 are reversed and the sensor 13 detects a S-pole field generated by the first magnet 14 and a N-pole field generated by the second magnet 21. In either configuration, the first and second magnets 14, 21 and the sensor 13 are positioned so that the sensor 13 can detect a S-pole field and a N-pole field.

For implementations in which the sensor 13 is a polarity-dependent magnetic sensor, the two outputs can be active high, active low, or alternatively use some other logic. An active high example will now be described for two outputs called "S Detect" and "N Detect" for detecting the S-pole field and the N-Pole field, respectively. If no magnetic field is detected, then both S Detect and N Detect will be low. If only S-pole field is detected, then only S Detect will be high. If only N-pole field is detected, then N Detect will be high. If the sensor detects both S-pole and N-pole field, then both S Detect and N Detect will be high.

It is noted that normal magnetic sensors are polarity-independent such that they activate at presence of either N-pole field or S-Pole field. They typically have a single output indicating presence/absence of magnetic field, regardless of the polarity of the magnetic field. This means that these magnetic sensors do not indicate the polarity of the magnetic field. Unlike the present disclosure, existing approaches using these magnetic sensors utilize a separate sensor to detect presence/absence of a holster. This is because the magnetic sensor used to detect whether the mobile device is in the open state or the closed state does not discern between the magnetic field from the magnet provided in the mobile device and the magnetic field from the magnet provided in the holster.

In alternative implementations (not shown) of the present disclosure, the first and second magnets 14, 21 are oriented so that the sensor 13 detects only S-pole field, or only N-pole field. In such implementations, the sensor 13 could detect a magnitude of a magnetic field indicative of both a magnetic field from the first magnet 14 and a magnetic field from the second magnet 21. For example, if the first magnet 14 has field strength=A and the second magnet 21 has field strength=B, then a field strength=A+B indicates presence of both magnets 14, 21; a field strength=B indicates presence of only the second magnet 21; a field strength=A indicates presence of only the first magnet 14; and a field strength=0 indicates that neither of the magnets 14, 21 are present.

There are many ways in which the sensor 13 might detect only S-pole field or only N-pole field. In some implementations, the sensor 13 includes a plurality of dies with different magnetic field strength triggering points in a single package. For example, the sensor 13 can be provided with three dies: a first die that triggers above field strength=A; a second die that triggers above field strength=B; and a third die that triggers above field strength=A+B. Therefore, based on the triggering of the three dies, it is possible to determine the magnitude of a magnetic field indicative of both the magnetic field from the first magnet 14 and the magnetic field from the second magnet 21. This allows for detecting (i) whether the mobile device 10 is in the open state or the closed state, and (ii) whether the mobile device 10 is in the holster 20. Other implementations are possible.

Alternative non-magnetic implementations are also possible in the present disclosure. For example, in an alternative implementation the sensor 13 is a proximity sensor. For this alternative implementation there may be issues in regards to objects interfering with the proximity sensor (e.g. user's hand) from detecting whether the mobile device 10 is slid open or slid closed and whether the mobile device 10 is in the holster 20. Note that in non-magnetic implementations there is no need for the magnets 14, 21. More generally, the sensor 13 can be any appropriate sensor capable of detecting at least one physical quantity indicative of (i) whether the mobile device 10 is slid open or slid closed, and (ii) whether the mobile device 10 is in the holster 20. The sensor 13 can have any suitable output from which the state determiner 19 can determine (i) whether the mobile device 10 is slid open or slid closed and (ii) whether the mobile device 10 is in the holster 20.

It is to be understood that the mobile device 10 may have other sensors (not shown) for other purposes. For example, the mobile device 10 may have sensors to detect whether various buttons or keys have been pressed on the user interface 18. The term "single sensor" used in this disclosure refers to one and only one sensor for the purpose of detecting a physical state of a mobile device and presence of a holster. However, use of this term does not preclude the possibility of the mobile device having other sensors for completely different purposes.

In some implementations, the state determiner 19 is implemented as software and is executed on the processor 16. More generally, the state determiner 19 may be implemented as software, hardware, firmware, or any appropriate combination thereof. In the illustrated example the state determiner 19 is shown to be separate from the processor 16. In alternative implementations, the state determiner 19 forms part of the processor 16. An example of this is described below with reference to FIG. 4. Other implementations are possible.

As noted above, in some implementations, the processor 16 executes at least one action based on (i) whether the mobile device 10 is slid open or slid closed and/or (ii) whether the mobile device 10 is in the holster 20. There are many possibilities for the at least one action. The at least one action can for example include providing power to the user interface 18 when the mobile device 10 is slid open, or turning off power to the user interface 18 when the mobile device 10 is slid closed. This could for example enable all keypads when the mobile device 10 is slid open, and enable only exposed keys when the mobile device 10 is slid closed. As another example, the at least one action could include disabling all keys when the mobile device 10 is in the holster 20. As a further example, the at least one action could include visual notification for an incoming call using the user interface 18 when the mobile device 10 is slid open, and audio notification for an incoming call when the mobile device 10 is slid closed. Other actions are possible and are within the scope of this disclosure.

In the illustrated example, the mobile device 10 is assumed to be a wireless device and can use the wireless access radio 17 for wireless services. Example wireless services that may be supported include telephony, push-to-talk, email, text messaging, GPS applications, etc. The mobile device 10 may also support various non-wireless services. Alternative non-wireless implementations are possible in which case there may be no wireless access radio 17. More generally, the mobile device 10 can be any appropriately configured mobile device regardless of whether it is wireless, for example a PDA (personal digital assistant), a laptop computer, a handheld device, a cell phone, a UE (user element), a wireless device, etc.

The illustrated example described above with reference to FIGS. 1 and 2 focus on a particular type of mobile device, namely a slider device. However, it is to be understood that embodiments of the disclosure are similarly applicable to other types of mobile devices, for example flip devices. An example flip device is described below with reference to FIG. 3A and 3B.

Figure 3A:
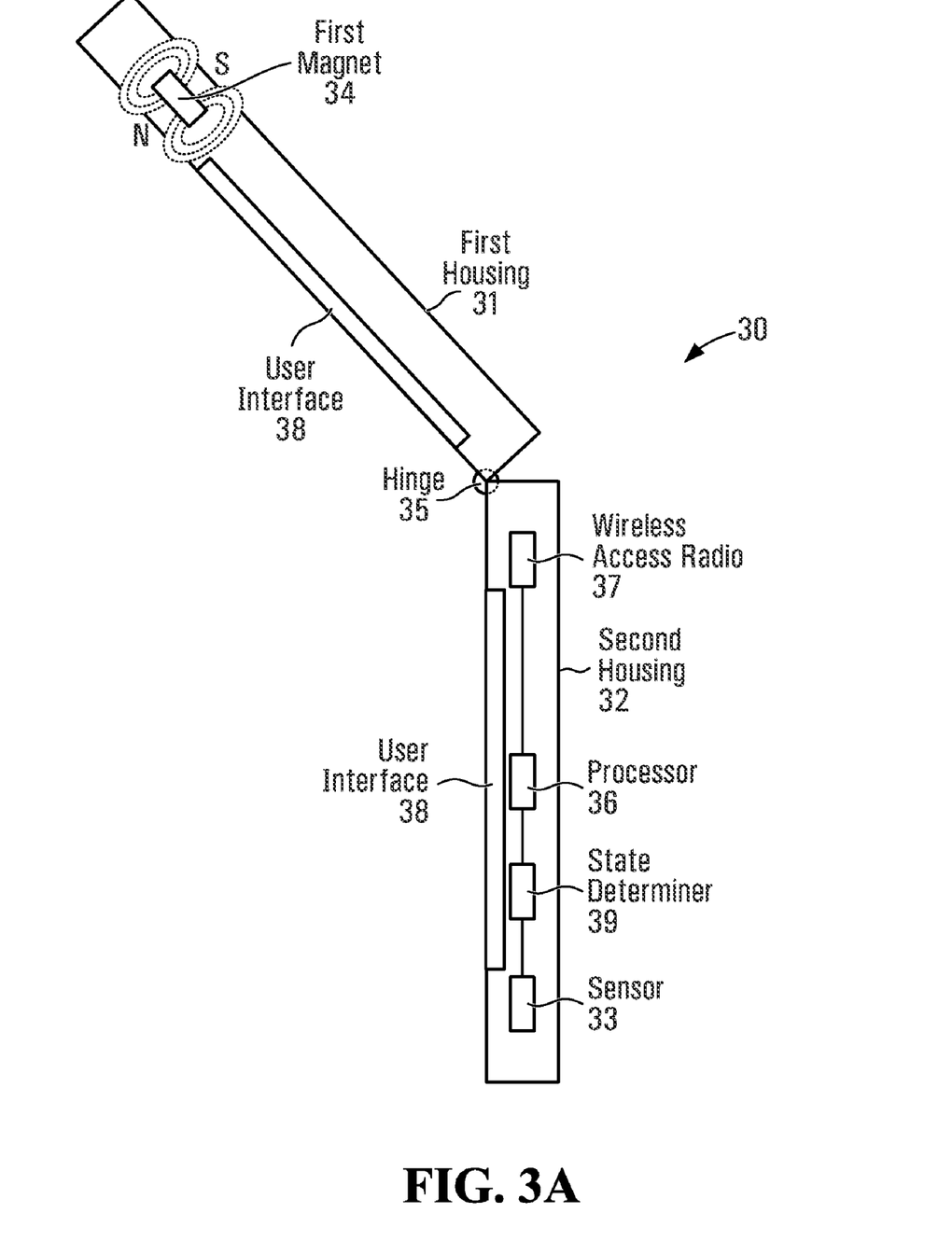
FIGS. 3A and 3B are block diagrams of another mobile device.
Figure 3B:
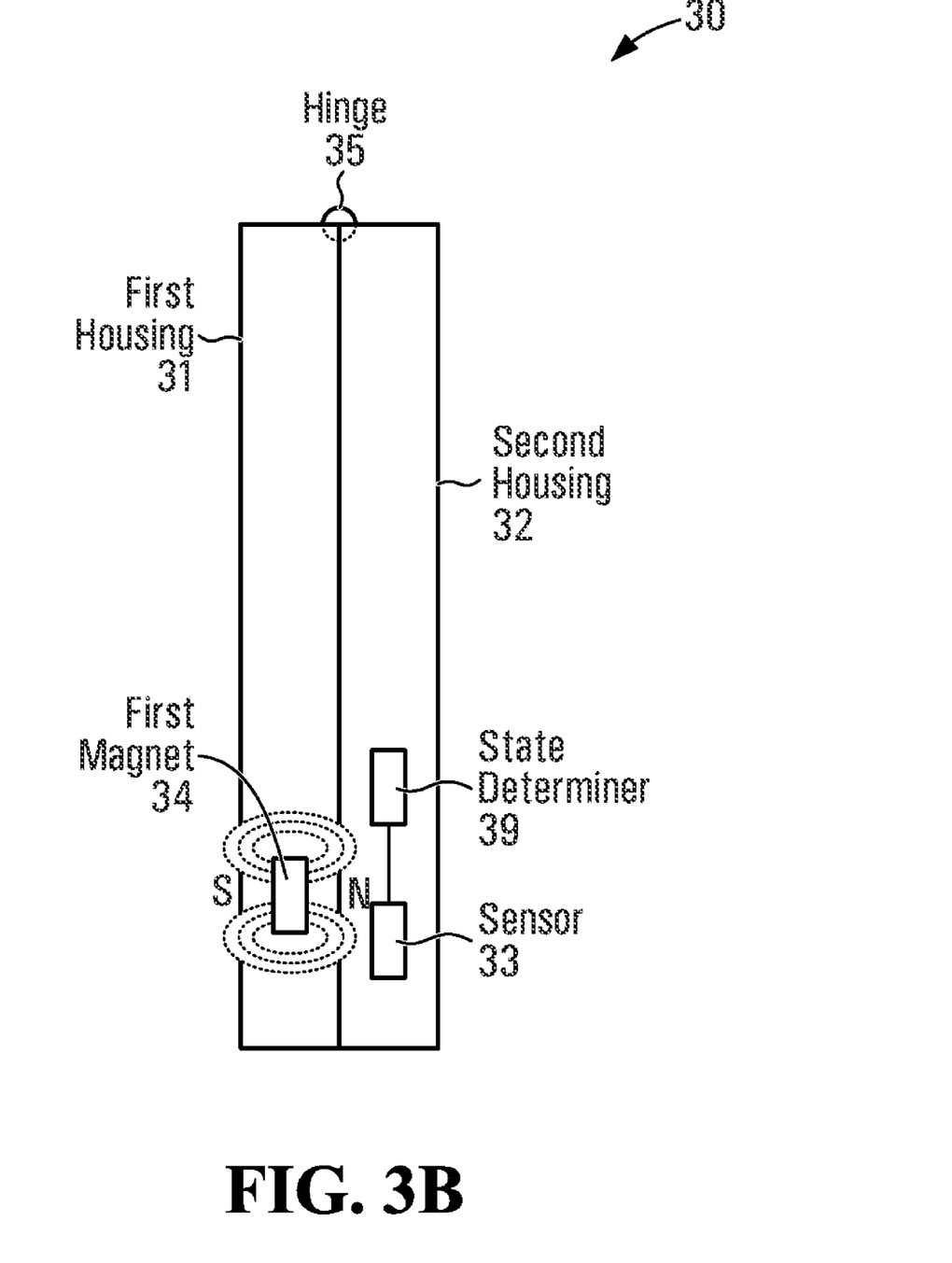

Referring now to FIG. 3A and 3B, shown are block diagrams of another mobile device 30. The mobile device 30 has a first housing 31 and a second housing 32 that is movably coupled to the first housing. The first housing 31 has a first magnet 34. The second housing 32 has a sensor 33, a state determiner 39, a processor 36, a wireless access radio 37, and a user interface 38. The mobile device 30 may have other components, but they are not shown for sake of simplicity.

The operation of the mobile device 30 will now be described by way of example. The second housing 32 is movably coupled to the first housing 31 using a hinge 35 or other pivot mechanism such that the mobile device 30 can be flipped open (see FIG. 3A) thereby making the user interface 38 available during use, and subsequently flipped closed (see FIG. 3B) thereby making the mobile device 30 compact again. The sensor 33 is configured to generate a sensor output indicative of whether the mobile device 30 is flipped open or flipped closed by detecting presence or absence of magnetic field from the first magnet 34. The state determiner 39 is configured to determine based on the sensor output whether the mobile device 30 is flipped open or flipped closed. Note that this detection is irrespective of whether the mobile device 30 is in a holster.

The operation of the mobile device 30 is otherwise similar to the operation described above for the mobile device 10 shown in FIGS. 1 and 2 and therefore many of those details are not repeated here. It is noted that the mobile device 30 can be placed in a holster (not shown) having a second magnet as similarly described above with reference to FIG. 2. In accordance with an embodiment of the disclosure, the sensor 33 is configured to generate the sensor output to additionally indicate whether the mobile device 30 is in the holster by detecting presence or absence of a magnetic field from the second magnet. The state determiner 39 is configured to determine based on the sensor output whether the mobile device 30 is in the holster. Note that this detection is irrespective of whether the mobile device 30 is flipped open or flipped closed. It is to be understood that the same sensor 33 is used for this purpose. There is no separate sensor to detect whether the mobile device 30 is in the holster. This can reduce cost of the mobile device 30. Additionally, or alternatively, this can reduce the size of the mobile device 30.

In some implementations, the processor 36 executes at least one action based on (i) whether the mobile device 30 is flipped open or flipped closed and/or (ii) whether the mobile device 30 is in the holster. The possibilities for these actions are similar to the actions that have been described for the mobile device 10 shown in FIGS. 1 and 2. For example, an internal LCD can be turned on when the mobile device 30 is flipped open, and an external LCD can be turned on when the mobile device 30 is flipped closed. Also, all LCDs can be turned off when the mobile device 30 is in the holster.

It is to be understood that embodiments of the disclosure are not limited to slider devices or flip devices as depicted in FIGS. 1 through 3. Whilst the mobile device 10 in FIGS. 1 and 2 has been described to slide open and slide closed, and the mobile device 30 in FIG. 3 has been described to flip open and flip closed, more generally, embodiments of the disclosure are applicable to any mobile device that can be manipulated between an open state and a closed state, regardless of whether the manipulation is by way of flipping, sliding, rotation, etc. Such embodiments include a sensor configured to generate a sensor output indicative of (i) whether the mobile device is in the open state or the closed state and (ii) whether the mobile device is in a holster. Such embodiments also include a state determiner configured to determine based on the sensor output (i) whether the mobile device is in the open state or the closed state and (ii) whether the mobile device is in a holster. Note that the detection of whether the mobile device is in the open state or the closed state is irrespective of whether the mobile device is in the holster. Likewise, the detection of whether the mobile device is in the holster is irrespective of whether the mobile device is in the open state or the closed state.

Figure 4:
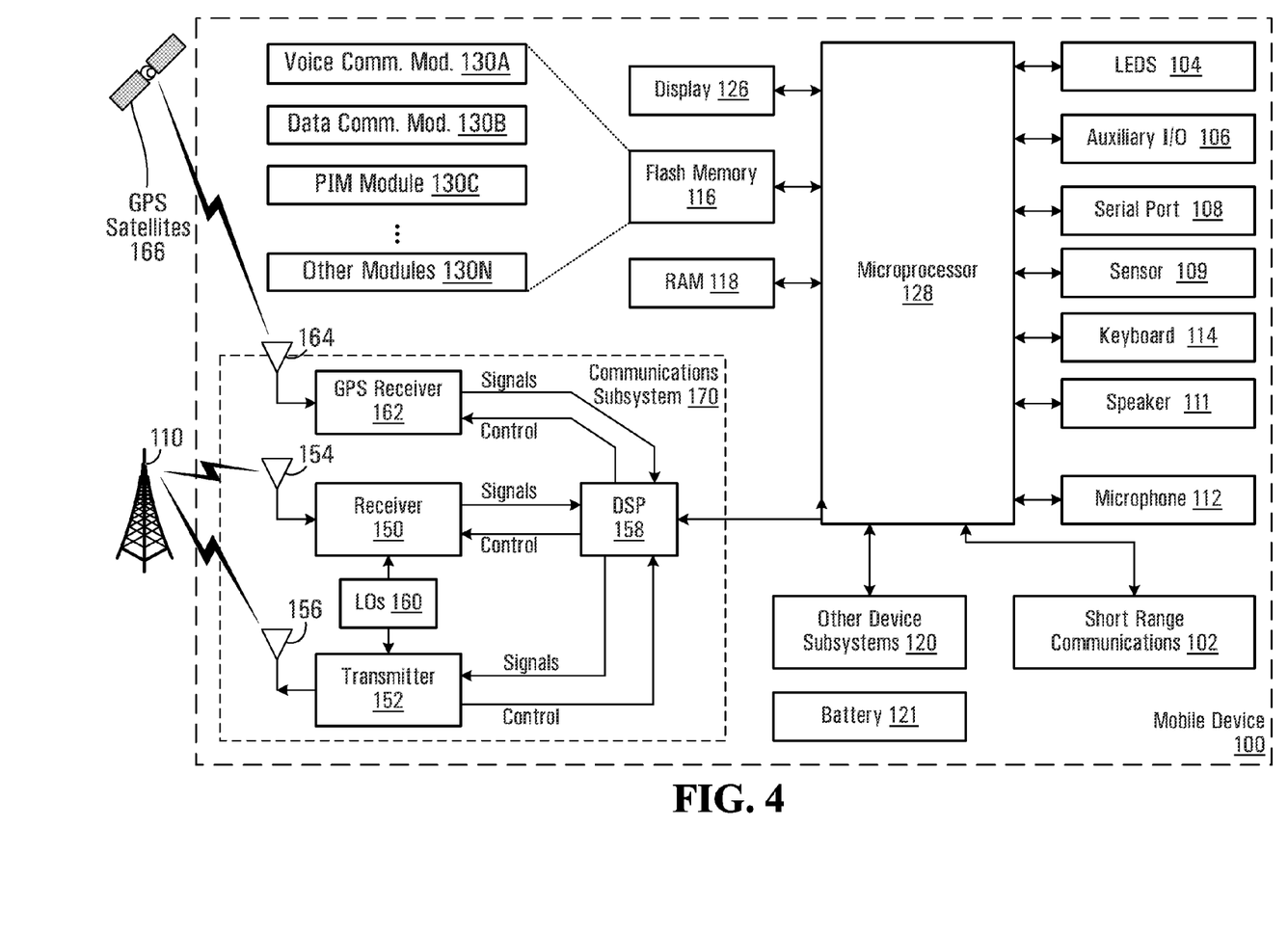
FIG. 4 is a block diagram of yet another mobile device.

Referring now to FIG. 4, shown is a block diagram of yet another mobile device 100. The mobile device 100 is not explicitly shown with any moving parts. However, it is to be understood that the mobile device 100 can nonetheless be manipulated between an open state and a closed state. It is also to be understood that the mobile device 100 is shown with very specific details for exemplary purposes only.

A microprocessor 128 is shown schematically as coupled between a keyboard 114 and a display 126. The microprocessor 128 is a type of processor with features similar to those of the processor 16 of the mobile device 10 shown in FIG. 1. The microprocessor 128 controls operation of the display 126, as well as overall operation of the mobile device 100, in response to actuation of keys on the keyboard 114 by a user. The keyboard 114 may include a mode selection key, or other hardware or software for switching between text entry and telephony entry. Whilst the mobile device 100 is shown with a particular input peripheral, namely the keyboard 114, it is to be understood that any suitable input peripheral can be used. In other implementations, the mobile device 100 is provided with a touch screen. Other implementations are possible.

Other parts of the mobile device 100 are shown schematically. These include: a communications subsystem 170; a short-range communications subsystem 102; the keyboard 114 and the display 126, along with other input/output devices including a set of LEDs 104, a set of auxiliary I/O devices 106, a serial port 108, a speaker 111 and a microphone 112; as well as memory devices including a flash memory 116 and a Random Access Memory (RAM) 118; and various other device subsystems 120. The keyboard 114 and display 126 are part of a user interface with features similar to the user interface 18 of the mobile device 10 shown in FIGS. 1 and 2, or the user interface 38 of the mobile device 30 shown in FIG. 3. The mobile device 100 may have a battery 121 to power the active elements of the mobile device 100. The mobile device 100 is in some embodiments a two-way radio frequency (RF) computing device having voice and data communication capabilities. In addition, the mobile device 100 in some embodiments has the capability to communicate with other computer systems via the Internet.

The mobile device 100 has a housing (not shown) that may be elongated vertically, or may take on other sizes and shapes (including clamshell housing structures). More generally, the mobile device 100 can be manipulated between an open state and a closed state. Similar to the sensors 13 and 33 described above with reference to FIGS. 1 to 3, a sensor 109 is configured to generate a sensor output indicative of whether the mobile device 100 is in the open state or the closed state. The microprocessor 128 is configured to determine based on the sensor output whether the mobile device 100 is in the open state or the closed state. Note that this detection is irrespective of whether the mobile device 100 is in a holster (not shown).

In accordance with an embodiment of the disclosure, the sensor 109 is configured to generate the sensor output to additionally indicate whether the mobile device 100 is in the holster. The microprocessor 128 is configured to determine based on the sensor output whether the mobile device 100 is in the holster. Note that this detection is irrespective of whether the mobile device 100 is in the open state or in the closed state. It is to be understood that the same sensor 109 is used for this purpose. There is no separate sensor to detect whether the mobile device 100 is in the holster. This can reduce cost of the mobile device 100. Additionally, or alternatively, this can reduce the size of the mobile device 100.

In some implementations and based on the sensor output described above, the microprocessor 128 executes at least one action based on (i) whether the mobile device 100 is in the open state or the closed state and/or (ii) whether the mobile device 100 is in the holster. The at least one action can for example include providing power to the display 126 when the mobile device 100 is in the open state, or turning off power to the display 126 when the mobile device 100 is in the closed state. As another example, the at least one action could include visual notification for an incoming call using the display 126 when the mobile device 100 is in the open state, or audio notification for an incoming call using the speaker 111 when the mobile device 100 is in the closed state. Other actions are possible and are within the scope of this disclosure.

Operating system software executed by the microprocessor 128 is in some embodiments stored in a persistent store, such as the flash memory 116, but may be stored in other types of memory devices, such as a read only memory (ROM) or similar storage element. In addition, system software, specific device applications, or parts thereof, may be temporarily loaded into a volatile store, such as the RAM 118. Communication signals received by the mobile device 100 may also be stored to the RAM 118.

The microprocessor 128, in addition to its operating system functions, enables execution of software applications on the mobile device 100. A predetermined set of software applications that control basic device operations, such as a voice communications module 130A and a data communications module 130B, may be installed on the mobile device 100 during manufacture. In addition, a personal information manager (PIM) application module 130C may also be installed on the mobile device 100 during manufacture. The PIM application is in some embodiments capable of organizing and managing data items, such as e-mail, calendar events, voice mails, appointments, and task items. The PIM application is also in some embodiments capable of sending and receiving data items via a wireless network 110. In some embodiments, the data items managed by the PIM application are seamlessly integrated, synchronized and updated via the wireless network 110 with the device user's corresponding data items stored or associated with a host computer system. As well, additional software modules, illustrated as another software module 130N, may be installed during manufacture.

Communication functions, including data and voice communications, are performed through the communication subsystem 170, and possibly through the short-range communications subsystem 102. The communication subsystem 170 includes a receiver 150, a transmitter 152, a GPS receiver 162, and one or more antennas, illustrated as a receive antenna 154, a transmit antenna 156, and a GPS antenna 164. In addition, the communication subsystem 170 also includes a processing module, such as a digital signal processor (DSP) 158, and local oscillators (LOs) 160. The specific design and implementation of the communication subsystem 170 is dependent upon the communication network in which the mobile device 100 is intended to operate. For example, the communication subsystem 170 of the mobile device 100 may be designed to operate with the Mobitex™, DataTAC™ or General Packet Radio Service (GPRS) mobile data communication networks and also designed to operate with any of a variety of voice communication networks, such as Advanced Mobile Phone Service (AMPS), Time Division Multiple Access (TDMA), Code Division Multiple Access (CDMA), Personal Communications Service (PCS), Global System for Mobile Communications (GSM), etc. Examples of CDMA include 1× and 1× EV-DO. The communication subsystem 170 may also be designed to operate with an 802.11 Wi-Fi network, and/or an 802.16 WiMAX network. Other types of data and voice networks, both separate and integrated, may also be utilized with the mobile device 100.

Network access may vary depending upon the type of communication system. For example, in the Mobitex™ and DataTAC™ networks, mobile devices are registered on the network using a unique Personal Identification Number (PIN) associated with each device. In GPRS networks, however, network access is typically associated with a subscriber or user of a device. A GPRS device therefore typically has a subscriber identity module, commonly referred to as a Subscriber Identity Module (SIM) card, in order to operate on a GPRS network.

When network registration or activation procedures have been completed, the mobile device 100 may send and receive communication signals over the communication network 110. Signals received from the communication network 110 by the receive antenna 154 are routed to the receiver 150, which provides for signal amplification, frequency down conversion, filtering, channel selection, etc., and may also provide analog to digital conversion. Analog-to-digital conversion of the received signal allows the DSP 158 to perform more complex communication functions, such as demodulation and decoding. In a similar manner, signals to be transmitted to the network 110 are processed (e.g., modulated and encoded) by the DSP 158 and are then provided to the transmitter 152 for digital to analog conversion, frequency up conversion, filtering, amplification and transmission to the communication network 110 (or networks) via the transmit antenna 156.

In addition to processing communication signals, the DSP 158 provides for control of the receiver 150, the transmitter 152, and the GPS receiver 162. For example, gains applied to communication signals in the receiver 150 and the transmitter 152 may be adaptively controlled through automatic gain control algorithms implemented in the DSP 158.

In a data communication mode, a received signal, such as a text message or web page download, is processed by the communication subsystem 170 and is input to the microprocessor 128. The received signal is then further processed by the microprocessor 128 for an output to the display 126, or alternatively to some other auxiliary I/O devices 106. A device user may also compose data items, such as e-mail messages, using the keyboard 114 and/or some other auxiliary I/O device 106, such as a touchpad, a rocker switch, a thumb-wheel, a trackball, a trackpad or some other type of input device. The composed data items may then be transmitted over the communication network 110 via the communication subsystem 170.

In a voice communication mode, overall operation of the device is substantially similar to the data communication mode, except that received signals are output to the speaker 111, and signals for transmission are generated by a microphone 112. Alternative voice or audio I/O subsystems, such as a voice message recording subsystem, may also be implemented on the mobile device 100. In addition, the display 126 may also be utilized in voice communication mode, for example, to display the identity of a calling party, the duration of a voice call, or other voice call related information.

Location determination using GPS technology involves receiving GPS signals from GPS satellites 166 on the antenna 164. The GPS signals are received using the GPS receiver 162 and processed by the DSP 158. Typically, GPS signals from at least four satellites are processed. Further details of GPS are omitted for simplicity.

The short-range communications subsystem 102 enables communication between the mobile device 100 and other proximate systems or devices, which need not necessarily be similar devices. For example, the short range communications subsystem may include an infrared device and associated circuits and components, or a Bluetooth™ communication module to provide for communication with similarly-enabled systems and devices.

Method for Detecting Device State & Holster

Figure 5:
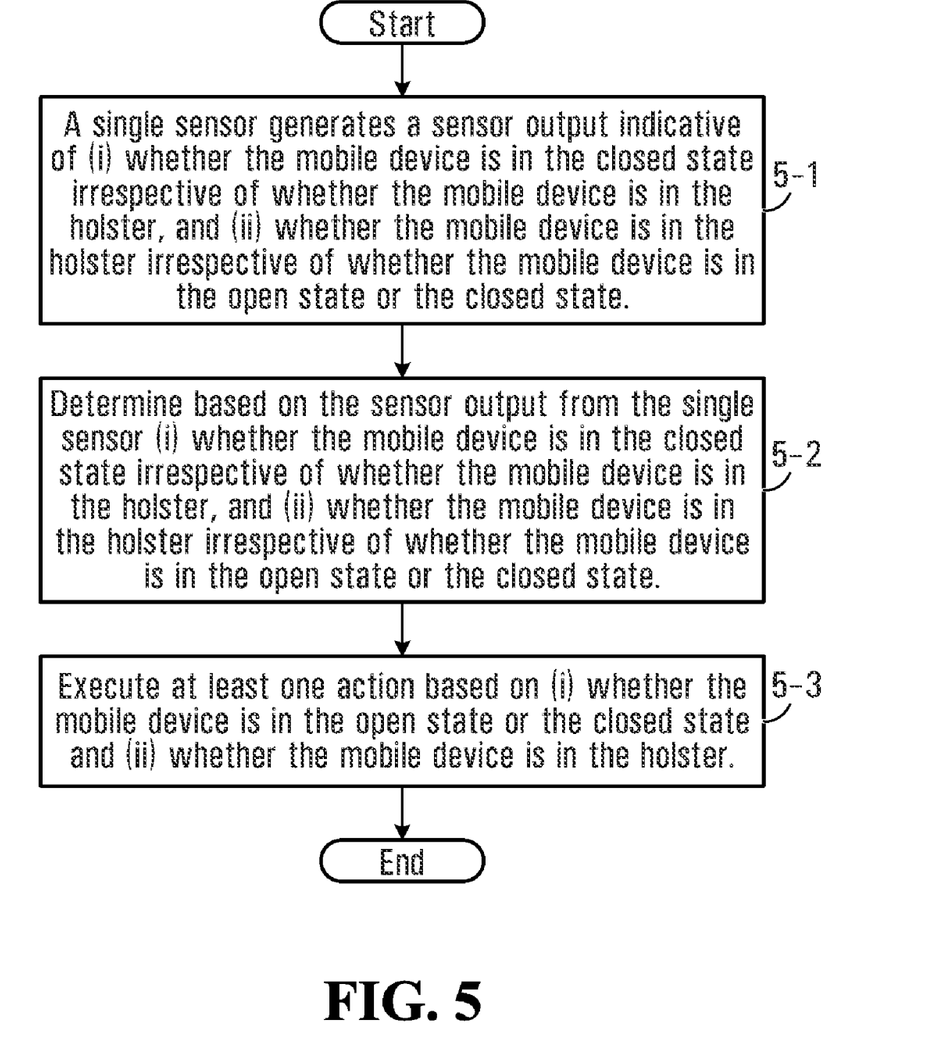
FIG. 5 is a flowchart of a method of using a single sensor to detect a physical state of a mobile device and presence of a holster.

Referring now to FIG. 5, shown is a flowchart of a method of using a single sensor to detect a physical state of a mobile device and presence of a holster. This method can be implemented by a mobile device, for example by the mobile device 10 shown in FIGS. 1 and 2, by the mobile device 30 shown in FIG. 3, or by the mobile device 100 shown in FIG. 4. More generally, this method can be implemented by any mobile device having a first housing and a second housing movably coupled to the first housing such that the mobile device can be manipulated between an open state and a closed state.

At step 5-1, a single sensor generates a sensor output indicative of (i) whether the mobile device is in the open state or the closed state irrespective of whether the mobile device is in the holster, and (ii) whether the mobile device is in the holster irrespective of whether the mobile device is in the open state or the closed state. At step 5-2, the mobile device determines based on the sensor output from the single sensor (i) whether the mobile device is in the open state or the closed state irrespective of whether the mobile device is in the holster, and (ii) whether the mobile device is in the holster irrespective of whether the mobile device is in the open state or the closed state. Note that only one sensor is used for this purpose. There is no separate sensor to detect whether the mobile device is in the holster. This can reduce cost of the mobile device. Additionally, or alternatively, this can reduce the size of the mobile device.

There are many possibilities for the sensor. In some implementations, the sensor is a magnetic sensor. Example magnetic implementations have been described above. Alternative non-magnetic implementations are also possible as described above. Implementation details of the sensor have been described above and are not repeated here.

In some implementations, as indicated at step 5-3, the mobile device executes at least one action based on (i) whether the mobile device is in the open state or the closed state and/or (ii) whether the mobile device is in the holster. Example actions that the mobile device can execute have been described above and are not repeated here.

Numerous modifications and variations of the present disclosure are possible in light of the above teachings. It is therefore to be understood that within the scope of the appended claims, the disclosure may be practised otherwise than as specifically described herein.

I claim:

1. A mobile device comprising:
   a first housing;
   a second housing movably coupled to the first housing such that the mobile device can be manipulated between an open state and a closed state;
   a sensor configured to generate a sensor output indicative of (i) whether the mobile device is in the open state or the closed state irrespective of whether the mobile device is in a holster and (ii) whether the mobile device is in the holster irrespective of whether the mobile device is in the open state or the closed state; and
   a state determiner configured to determine based on the sensor output from the sensor (i) whether the mobile device is in the open state or the closed state irrespective of whether the mobile device is in the holster and (ii) whether the mobile device is in the holster irrespective of whether the mobile device is in the open state or the closed state.

2. The mobile device of claim 1, wherein the second housing is movably coupled to the first housing using a pivot mechanism such that the open state is a state in which the mobile device is flipped open and the closed state is a state in which the mobile device is flipped closed.

3. The mobile device of claim 1, wherein the second housing is slidably coupled to the first housing such that the open state is a state in which the mobile device is slid open and the closed state is a state in which the mobile device is slid closed.

4. The mobile device of claim 1, further comprising:
a processor configured to execute at least one action based on at least one of (i) whether the mobile device is in the open state or the closed state and (ii) whether the mobile device is in the holster.

5. The mobile device of claim 1, wherein the sensor is a magnetic sensor.

6. The mobile device of claim 5, wherein:
the magnetic sensor is provided in one of the first housing and the second housing, the other of the first and second housing having a first magnet;
the holster is provided with a second magnet; and
the magnetic sensor is configured to generate the sensor output by converting (i) a magnetic field from the first magnet and (ii) a magnetic field from the second magnet into the sensor output.

7. The mobile device of claim 6, wherein:
the sensor output comprises a first output and a second output; and
the magnetic sensor is configured to convert (i) the magnetic field from the first magnet and (ii) the magnetic field from the second magnet into the sensor output by:
(i) converting a N-pole field from the first magnet into the first output and (ii) converting a S-pole field from the second magnet into the second output; or
(i) converting a S-pole field from the first magnet into the first output and (ii) converting a N-pole field from the second magnet into the second output.

8. The mobile device of claim 6, wherein:
the magnetic sensor is configured to convert (i) the magnetic field from the first magnet and (ii) the magnetic field from the second magnet into the sensor output by:
converting a magnitude of a magnetic field into the sensor output, the magnitude of the magnetic field being indicative of both (i) the magnetic field from the first magnet and (ii) the magnetic field from the second magnet.

9. A holster in combination with a mobile device, the mobile device comprising:
a first housing;
a second housing movably coupled to the first housing such that the mobile device can be manipulated between an open state and a closed state;
a sensor configured to generate a sensor output indicative of (i) whether the mobile device is in the open state or the closed state irrespective of whether the mobile device is in the holster and (ii) whether the mobile device is in the holster irrespective of whether the mobile device is in the open state or the closed state; and
a state determiner configured to determine based on the sensor output from the sensor (i) whether the mobile device is in the open state or the closed state irrespective of whether the mobile device is in the holster and (ii) whether the mobile device is in the holster irrespective of whether the mobile device is in the open state or the closed state.

10. A method comprising:
a sensor generating a sensor output indicative of (i) whether a mobile device having a first housing and a second housing is in an open state or a closed state irrespective of whether the mobile device is in a holster, and (ii) whether the mobile device is in the holster irrespective of whether the mobile device is in the open state or the closed state; and
determining based on the sensor output from the sensor (i) whether the mobile device is in the open state or the closed state irrespective of whether the mobile device is in the holster, and (ii) whether the mobile device is in the holster irrespective of whether the mobile device is in the open state or the closed state.

11. The method of claim 10, wherein the second housing is movably coupled to the first housing using a pivot mechanism such that the open state is a state in which the mobile device is flipped open and the closed state is a state in which the mobile device is flipped closed.

12. The method of claim 10, wherein the second housing is slidably coupled to the first housing such that the open state is a state in which the mobile device is slid open and the closed state is a state in which the mobile device is slid closed.

13. The method of claim 10, further comprising:
executing at least one action based on at least one of (i) whether the mobile device is in the open state or the closed state and (ii) whether the mobile device is in the holster.

14. The method of claim 10, wherein the sensor is a magnetic sensor.

15. The method of claim 14, wherein:
the magnetic sensor is provided in one of the first housing and the second housing, the other of the first and second housing having a first magnet
the holster is provided with a second magnet; and
generating the sensor output comprises converting (i) a magnetic field from the first magnet and (ii) a magnetic field from the second magnet into the sensor output.

16. The method of claim 15, wherein:
the sensor output comprises a first output and a second output; and
converting (i) the magnetic field from the first magnet and (ii) the magnetic field from the second magnet into the sensor output comprises:
(i) converting a N-pole field from the first magnet into the first output and (ii) converting a S-pole field from the second magnet into the second output; or
(i) converting a S-pole field from the first magnet into the first output and (ii) converting a N-pole field from the second magnet into the second output.

17. The method of claim 15, wherein converting (i) the magnetic field from the first magnet and (ii) the magnetic field from the second magnet into the sensor output comprises:
converting a magnitude of a magnetic field into the sensor output, the magnitude of the magnetic field being indicative of both (i) the magnetic field from the first magnet and (ii) the magnetic field from the second magnet.

* * * * *